UNITED STATES PATENT OFFICE.

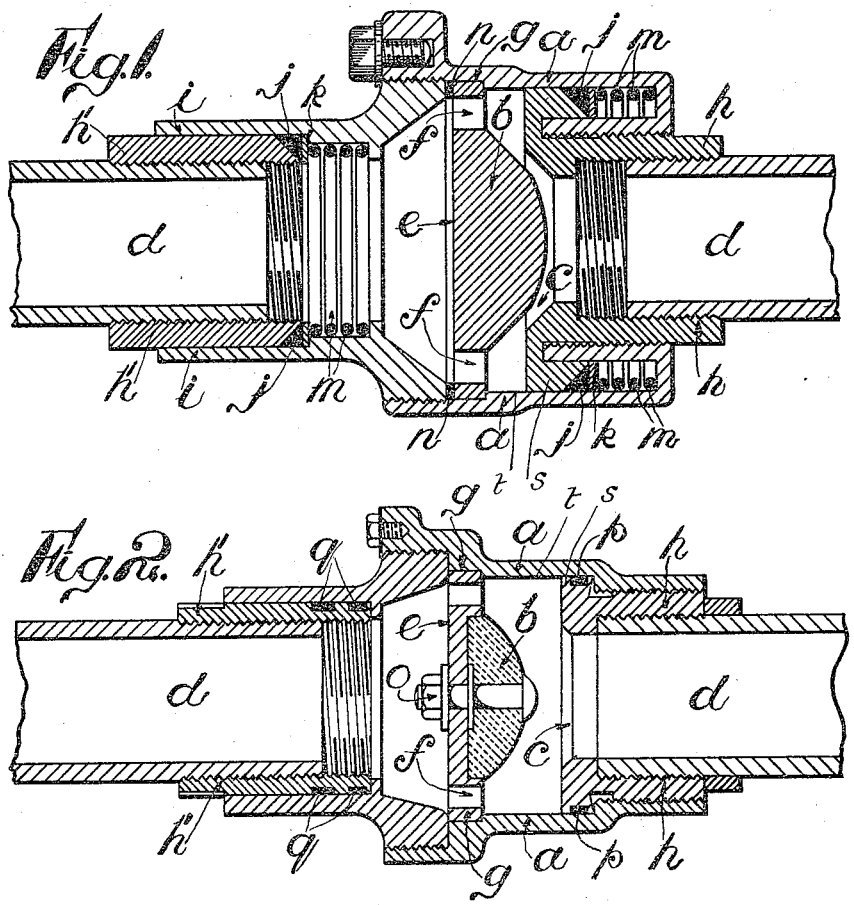

JAMES CLAYTON AND RICHARD TAYLOR, OF BLACKPOOL, ENGLAND.

VALVE FOR STEAM OR WATER OR OTHER LIQUIDS OR FLUIDS.

1,165,073.  Specification of Letters Patent.  Patented Dec. 21, 1915.

Application filed July 19, 1913. Serial No. 779,971.

*To all whom it may concern:*

Be it known that we, JAMES CLAYTON and RICHARD TAYLOR, subjects of the King of Great Britain and Ireland, and residents of Blackpool, in the county of Lancaster, England, have invented certain new and useful Improvements in Valves for Steam or Water or other Liquids or Fluids, of which the following is a specification.

This invention relates to valves which connect two pipes or pipe sections and regulate the flow of gas or liquid through them; and it consists in the novel construction and combination of the parts hereinafter fully described and claimed.

In the drawings, Figure 1 is a longitudinal section through a valve constructed according to this invention. Fig. 2 is a similar view, but shows a modification.

In accordance with our invention we employ a valve casing $a$ or body of any suitable shape, size and cross section and which in contradistinction to valves as ordinarily used is capable of rotation and movement in an axial direction, to enable the valve to be opened or closed, that is to say, the body of the valve moves instead of the spindle as in ordinary valves. This valve body is provided internally with a valve $b$ cast with or attachable to it, such valve having a curved or spherical closure portion which may be detachable, if desired, as in Fig. 2 for renewal purposes and in any case adapted to be brought into contact with a seating $c$ on the pipe main $d$ or merely against the end of the pipe. Surrounding the valve closure portion and passing through its supporting wall $e$ is a number of holes or slots $f$, leaving arms $g$, or arms and a ring by which the valve is supported within or secured to the casing $a$. The valve and support may be arranged loosely within the casing, if desired. The holes or slots $f$ may be of any suitable size so as to offer as little obstruction as possible to the flow of the liquid or fluid. The valve arms $g$ may also be of any suitable cross section for the same reason. To arrange for opening or closing the pipe main $d$, the valve is capable of being rotated and moved along with the casing in an axial direction for this purpose. In Fig. 1 the pipe main $d$ has fitted on the end a flanged extension $h$ in which the seating $c$ is formed, such extension being fixed. The exterior of the flanged extension $h$ is threaded and a corresponding thread is formed at the interior of one end of the casing $a$ so that on turning such casing around the valve is traversed toward and from the seat $c$ to close or open the pipe main. The opposite end $i$ of the valve casing is mounted slidably upon a screwed extension $h^1$ fitted to the opposite end of the pipe main $d$. In order to retain a tight joint at each end of the casing $a$ packing $j$ is employed backed up by a ring $k$ which is forced toward the packing by a spring $m$ in each case. The valve $b$ is placed loosely within the casing $a$ which is made in two halves screwed together with a packing ring $n$ between the faces. This arrangement allows of the valve $b$ being readily removed when required. The flange of the extension $h$ forms a piston $s$ which slides watertight in a cylinder $t$ formed in the casing $a$, being kept watertight by the packing.

In Fig. 2 the valve portion $b$ is separate from its wall $e$, being secured thereto by means of a bolt $o$ or the like. The valve is loose within the divided casing $a$ as previously mentioned. In Fig. 2 the extension $h$ is provided with packing ring $p$ on its periphery and the extension $h^1$ with one or more packing rings $q$. The arrangement is substantially similar to that shown in Fig. 1 in other respect.

What we claim is:

The combination, with two straight pipe sections having their water passages arranged in line with each other, one of the pipe sections having a screwthreaded extension, a piston, and a valve seat arranged concentric with the water passages; and the other pipe section having a smooth extension; of a revoluble and longitudinally movable valve casing provided with screwthreaded and smooth portions which engage with the respective extensions and having also a cylinder in which the said piston slides watertight, and a valve plate secured to the valve casing so as to move longitudinally with it and having a centrally arranged valve for closing the valve seat, said plate having also a series of water passages arranged around the valve and constantly open.

In testimony whereof we have hereunto set our hands in the presence of two witnesses.

JAMES CLAYTON.
RICHARD TAYLOR.

Witnesses:
JOSEPH HASLAM,
GUY EDDLESTON.

Copies of this patent may be obtained for five cents each, by addressing the "Commissioner of Patents, Washington, D. C."